(12) United States Patent
Hafner et al.

(10) Patent No.: US 10,753,510 B2
(45) Date of Patent: Aug. 25, 2020

(54) CONDUIT GUIDE FOR GUIDING AT LEAST ONE CONDUIT SECTION BETWEEN TWO ELEMENTS

(71) Applicant: Binder GmbH, Tuttlingen (DE)

(72) Inventors: Rainer Hafner, Leibertingen (DE); Patrick Efinger, Aldingen-Aixheim (DE); Jochen Bollaender, Trossingen (DE)

(73) Assignee: Binder GmbH, Tuttlingen (DE)

( * ) Notice: Subject to any disclaimer, the term of this patent is extended or adjusted under 35 U.S.C. 154(b) by 0 days.

(21) Appl. No.: 16/429,786

(22) Filed: Jun. 3, 2019

(65) Prior Publication Data
US 2019/0368635 A1 Dec. 5, 2019

(30) Foreign Application Priority Data

Jun. 4, 2018 (DE) ........................ 10 2018 113 248

(51) Int. Cl.
*F16L 3/01* (2006.01)
*F16L 3/00* (2006.01)

(52) U.S. Cl.
CPC ................. *F16L 3/01* (2013.01); *F16L 3/006* (2013.01)

(58) Field of Classification Search
CPC ........................................................ F16L 3/01
USPC ........................................................ 174/481
See application file for complete search history.

(56) References Cited

U.S. PATENT DOCUMENTS

| | | | |
|---|---|---|---|
| 2,425,823 A * | 8/1947 | Parsons | B62D 25/04 49/167 |
| 3,907,334 A | 9/1975 | Schera | |
| 9,660,427 B1 | 5/2017 | Shah et al. | |
| 2005/0012333 A1 | 1/2005 | Baich et al. | |
| 2006/0001261 A1* | 1/2006 | Miyajima | F16L 5/10 285/136.1 |
| 2010/0307794 A1 | 12/2010 | Baydoun et al. | |
| 2012/0018960 A1 | 1/2012 | Andersson et al. | |
| 2013/0126233 A1 | 5/2013 | Nagayasu et al. | |
| 2017/0264090 A1 | 9/2017 | Shah et al. | |

FOREIGN PATENT DOCUMENTS

| | | |
|---|---|---|
| CN | 103328267 | 9/2013 |
| DE | 6903983 | 4/1969 |
| DE | 10355271 | 6/2005 |
| DE | 102004043730 | 3/2006 |
| DE | 102010022639 | 12/2010 |

(Continued)

OTHER PUBLICATIONS

European Patent Office, "European Search Report" issued in European Patent Application No. 119 163657.0, dated Sep. 27, 2019, document of 7 pages.

(Continued)

*Primary Examiner* — Stanley Tso
(74) *Attorney, Agent, or Firm* — Akerman LLP; Peter A. Chiabotti (57) ABSTRACT

A conduit guide for guiding at least one conduit section between a first element and a second element with an insert part, having a tubular guiding element and arrangeable at the first element, and a tubular receiving part, arrangeable at the second element, wherein the guiding element of the insert part is arranged so as to be axially movable in the receiving part.

14 Claims, 5 Drawing Sheets

(56) References Cited

FOREIGN PATENT DOCUMENTS

| | | |
|---|---|---|
| EP | 1157894 | 11/2001 |
| FR | 2744781 | 8/1997 |
| RU | 118478 | 7/2012 |
| WO | 2012111182 | 8/2012 |

OTHER PUBLICATIONS

Russian Patent Office, "Decision to Grant" issued in Russian Patent Application No. 2019110977, dated Sep. 13, 2019, document of 10 pages.
German Patent Office, "Office Action" issued in German Patent Application No. 10 2018 113 248.4, dated May 22, 2019, document of 6 pages.
State Intellectual Property Office of the People's Repubic of China, "First Office Action" and English translation thereof, issued for Chinese Patent Application No. 201910383690.6, dated Apr. 23, 2020, document of 15 pages.

\* cited by examiner

CONDUIT GUIDE FOR GUIDING AT LEAST ONE CONDUIT SECTION BETWEEN TWO ELEMENTS

CROSS-REFERENCE TO RELATED APPLICATIONS

This application claims priority to German Patent Application No. 10 2018 113 248.4, filed Jun. 4, 2018, which is incorporated by reference in its entirety.

BACKGROUND

The present application relates to a conduit guide for guiding at least one conduit section between two elements.

SUMMARY

Such conduit guides are used to guide conduit sections, consisting of at least one conduit, such as a cable or a tube, between two elements which are particularly movable relative to each other. Frequently, these are elements of a device, particularly a vehicle, movable relative to each other, for example, a door and the housing or the body, respectively. Significant aspects for using a conduit guide are the protection of the guided conduit section against bending and pinching as well as against external effects.

From the prior art, various conduit guides are known. EP 1 157 894 A1 discloses a conduit guide designed integrally where a bellow is arranged between two connecting elements. One of the connecting elements has a guiding element which enables a deflection of the conduit at the end of the conduit guide.

DE 103 55 271 A1 also shows a conduit guide in the form of a bellow whose ends are each fixed at the elements movable relative to each other. Furthermore, this document provides means for reducing the friction between the bellow and the conduit guided therein, for example, in the form of an additional sheath of the conduit.

Such conduit guides are very flexible. However, the part bridging the distance between both elements movable relative to each other is always in the gap between both elements. Particularly in situations where both elements are relatively close to each other, such conduit guides have a detrimentally large space requirement between both elements movable relative to each other.

Thus, the present disclosure provides a space-saving conduit guide.

According to the present disclosure, a conduit guide with the features and structures described herein is disclosed.

Advantageous configurations and further developments of the present disclosure are further disclosed herein.

The conduit guide according to the present disclosure is characterized in that it has an insert part for guiding at least one conduit section between a first element and a second element which has a tubular guiding element and may be arranged at the first element. Furthermore, such a conduit guide has a tubular receiving part which may be arranged at the second element. The tubular guiding element as well as the tubular receiving part do not necessarily have to have a circular cross section. Furthermore, particularly the length of the tubular receiving part may be significantly smaller than its diameter.

According to the present disclosure, the guiding element of the insert part is arranged in the receiving part so as to be axially movable. Preferably, the conduit section is arranged in the insert part, wherein the part of the insert part is the guiding element which guides the conduit section between the first element and the second element. The first element and the second element are particularly two elements of a device permanently or only intermittently movable relative to each other. If the first element and the second element move towards each other, the insert part is preferably inserted into the receiving part.

An arrangement of the conduit guide between two elements which rarely or do not move relative to each other is also possible. As an example, two elements of an equipment are mentioned which are positioned at fixed positions in the final setup state of the equipment and wherein there is only a relative movement therebetween in installation situations. In the event of such applications, the characteristic of the conduit guiding is used in order to compensate for a linear-axial offset in the receiving part between the first and the second element due to the axial movability of the insert part and thus the protection of the conduit section is ensured.

According to a particularly advantageous embodiment, the insert part and/or the receiving part consist at least sectionally of a resilient material, preferably of an elastomer, particularly preferably of polyurethane. By using a resilient, preferably rubber-like material, a radial, angled or rotatory offset may be compensated for in addition to the linear-axial offset in the event of a relative movement between the insert part and the receiving part using pure elastic deformation, particularly of the guiding element. Thus, the area of application of a conduit guide expands to applications where the insert part and the receiving part do not move purely linearly-axially relative to each other. As an example, an arrangement may be mentioned where the second element depicts a device and the first element depicts a door of the device which are connected by a hinge.

In order to keep the force and the stress of the components involved in the deformation as low as possible, the deformation behavior of the conduit guide may be facilitated additionally by designing the geometry of the conduit guide such that its moment of resistance regarding the preferred deformation direction is minimized.

According to a preferred embodiment, the insert part and the receiving part may have at least one flange element. Particularly, if the first element and/or the second element provide for a bore or a recess for receiving the insert part or the receiving part, respectively, the presence of a flange element may be particularly preferable for their arrangement in the first element or the second element, respectively. In this case, the flange element is particularly preferably designed such that there is a fit between the flange element and the first element or the second element, respectively, which realizes a stable seat of the conduit guide as well as a sealing effect which prevents the unintended passage of, for example, gases, liquids or debris. For both functions, it may be advantageous if the flange element consists of an elastomer, such as polyurethane.

For the simultaneous arrangement of the insert element or the receiving element at several parts of the first element or the second element, respectively, for example, at several walls positioned successively, the insert part or the receiving part, respectively, may have several flange elements.

The flange element is preferably designed such that it has an internal contact element and an external contact element. The internal contact element and the external contact element may be arranged such that a wall of the first element or the second element, respectively, may be arranged therebetween. Particularly preferably, the internal contact element or the external contact element, respectively, is in precise contact with the wall, thereby improving the stability of the conduit guide and the sealing effect of the flange element. For the sealing effect, it may also be advantageous if the internal contact element or the external contact element, respectively, consists of an elastomer, for example polyurethane.

Preferably, the receiving part has at least one receiving grommet. The receiving grommet may be arranged at the internal contact element and/or at the external contact element of the flange element. By arranging at least one receiving grommet, particularly the rigidity of the receiving part is increased.

According to a particularly preferred embodiment, an inner diameter of the receiving part and an outer diameter of the guiding element are in linear or planar contact. A planar contact between the receiving part and the guiding element may be increased if the receiving part has one or more receiving grommets which form at least one part of the part of the receiving element being in contact with the guiding element. If the planar contact is increased by one or more receiving grommets, for example, the rigidity and thus the stability of the whole conduit guide may be increased. This may be particularly advantageous if an offset is compensated for by the guiding element. Furthermore, the contact may have a sealing effect, thereby preventing the unintended passage of, for example, gases, liquids or debris, particularly between the second element and the environment.

According to a further development, the receiving part may have at least sectionally a ribbing in the area of contact on the side facing the guiding element. This ribbing may particularly be used for reducing the friction between the receiving part and the guiding element.

According to a particularly preferred embodiment, the insert part has an end engaging through the receiving part. This engaging end may particularly extend to the interior of the second element. Thus, the length of the insert part, particularly the guiding element, may be selected independently from the length of the receiving part.

In order to prevent sliding out the guiding element of the receiving part in the event of relative movements between the first element and the second element which results in a large displacement path between the insert part and the receiving part, the insert part has a blocking element at the engaging end the insert part in a further development of the present disclosure. Thus, engaging through the end of the insert part through the receiving part and thus the functionality of the conduit guide may be ensured when using the conduit guide near its design limits.

Preferably, the blocking element is formed by expanding the guiding element. Thus, the expansion may meet its blocking function if its biggest outer diameter is bigger than the smallest inner diameter of the receiving part.

According to a further development, the insert part has an opening piece on at least one of its ends. The opening piece may thus be positioned within the first element and within the second element. Its function is substantially to specify the orientation of the conduit section beyond the conduit guide and thus prevent damaging the conduit section, for example, by bending or abrasion at the ends of the insert part. For meeting this function, the opening piece may thus have at least one bend.

In one preferred embodiment, the insert part and/or the receiving part are configured integrally. The conduit guide may thus only consist of two single parts. If the insert part or the receiving part, respectively, is formed at least sectionally of an elastomer, the installation of the conduit guide may be performed by respective folding the insert part or the receiving part, respectively, due to the high resilience of the material. This may be particularly successful if one of the flange elements has an internal contact element and an external contact element or the blocking element is formed by expanding the guiding element and has to be engaged through the receiving part for installation.

A system according to the present disclosure comprises a conduit guide as well as a first element and a second element, wherein the second element may be a device and the first element may be a door of the device. The device may particularly be formed by an incubator, a climatic chamber, a simulation chamber or a vehicle.

Simulation chambers are used in scientific laboratories or in industrial applications for producing and simulating biological, chemical and/or physical space conditions or environmental effects, such as temperature, barometric pressure and/or humidity.

BRIEF DESCRIPTION OF DRAWINGS

One exemplary embodiment of the present application is explained using the following figures. In the drawings:

FIGS. 1 to 5 show several views of an exemplary embodiment. For the sake of clarity, not all reference numbers are used in each figure.

DETAILED DESCRIPTION

Figure 1:
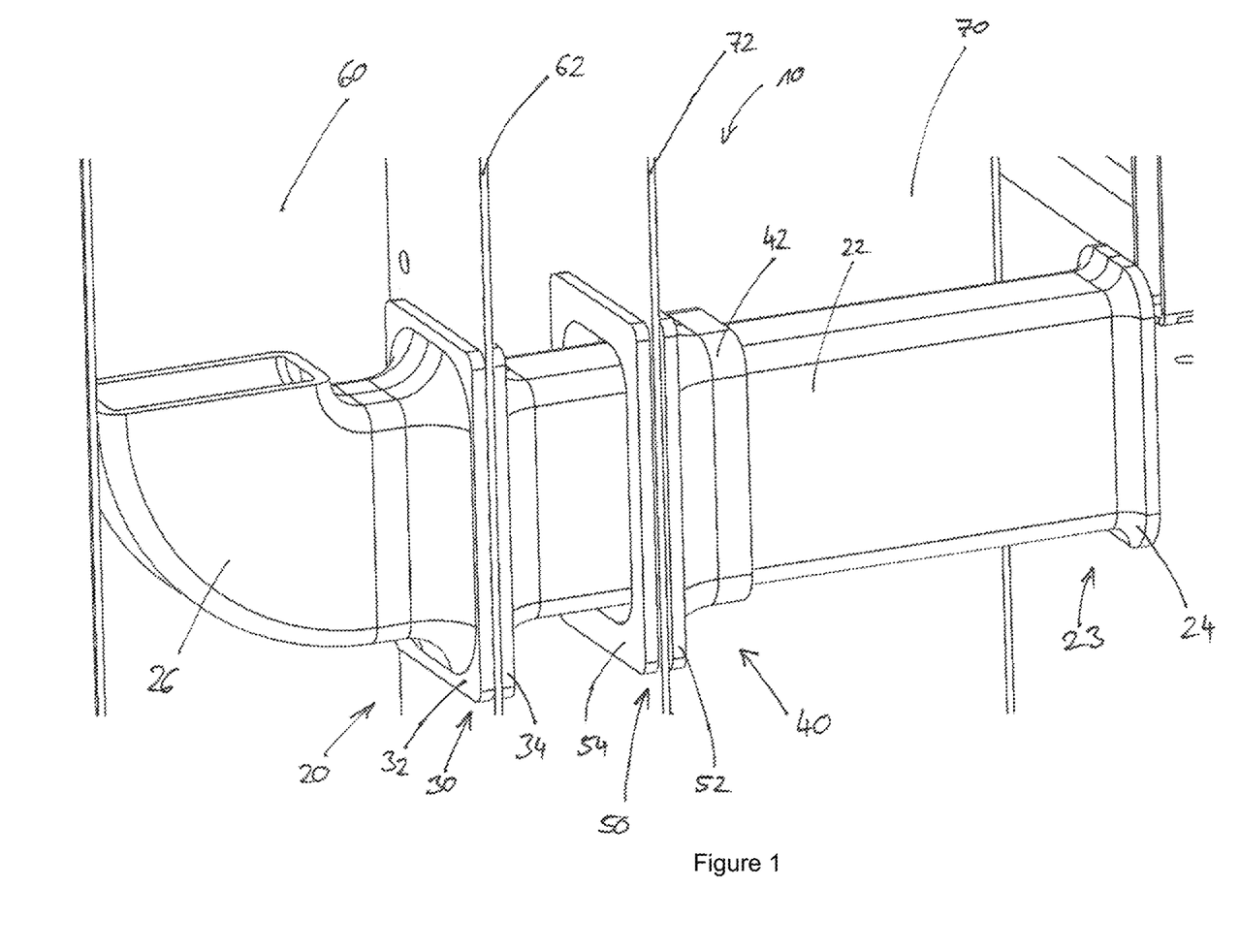
FIG. 1 shows a three-dimensional illustration of an exemplary embodiment of a conduit guide according to the present disclosure in an installation situation.
Figure 2:
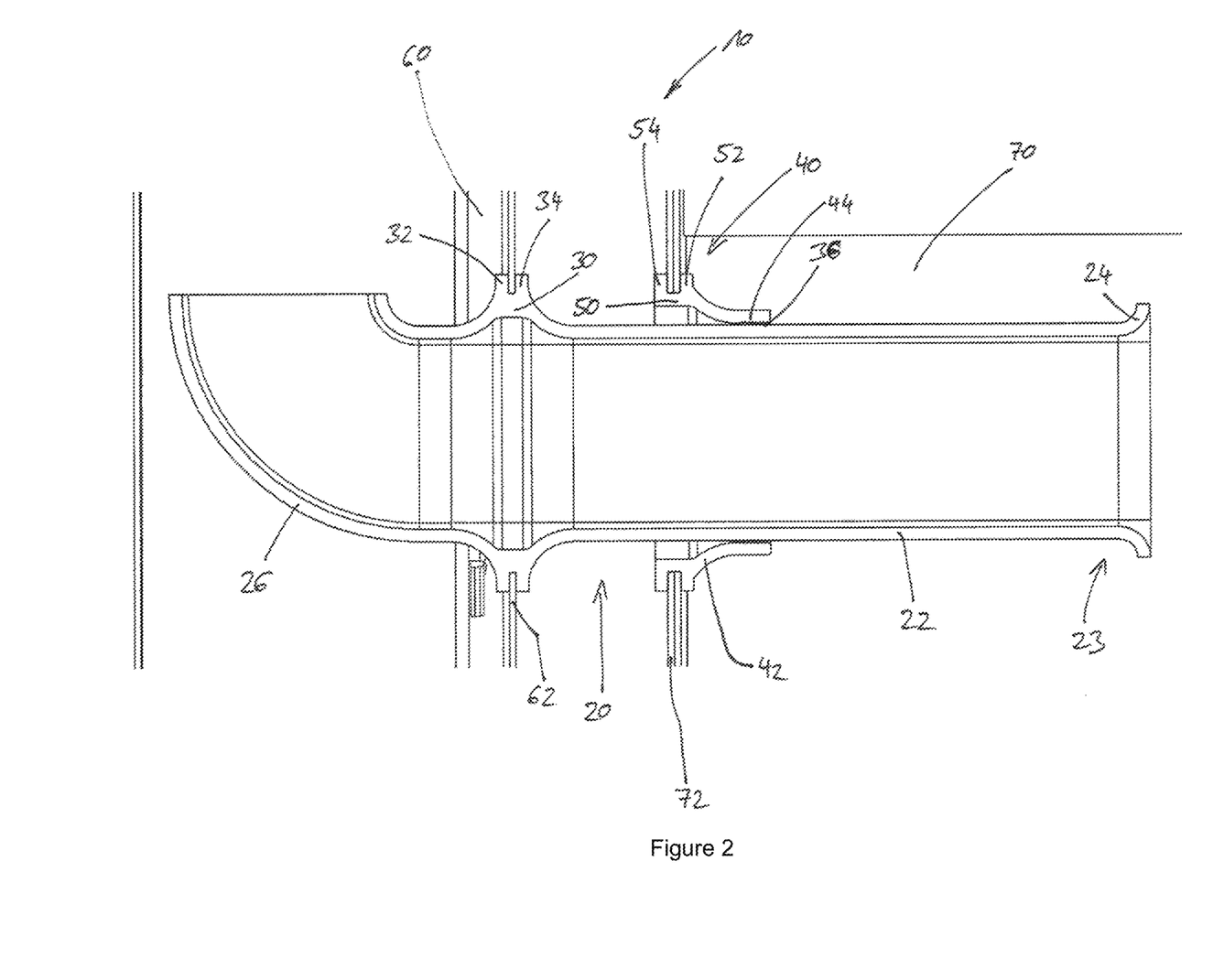
FIG. 2 shows a two-dimensional longitudinal section of the exemplary embodiment depicted in FIG. 1 of the installation situation depicted in FIG. 1.

FIGS. 1 and 2 show several views of an exemplary embodiment of a conduit guide 10. For guiding at least one conduit section between a first element 60 and a second element 70, the conduit guide 10 has an insert part 20 and a receiving part 40.

Figure 4:
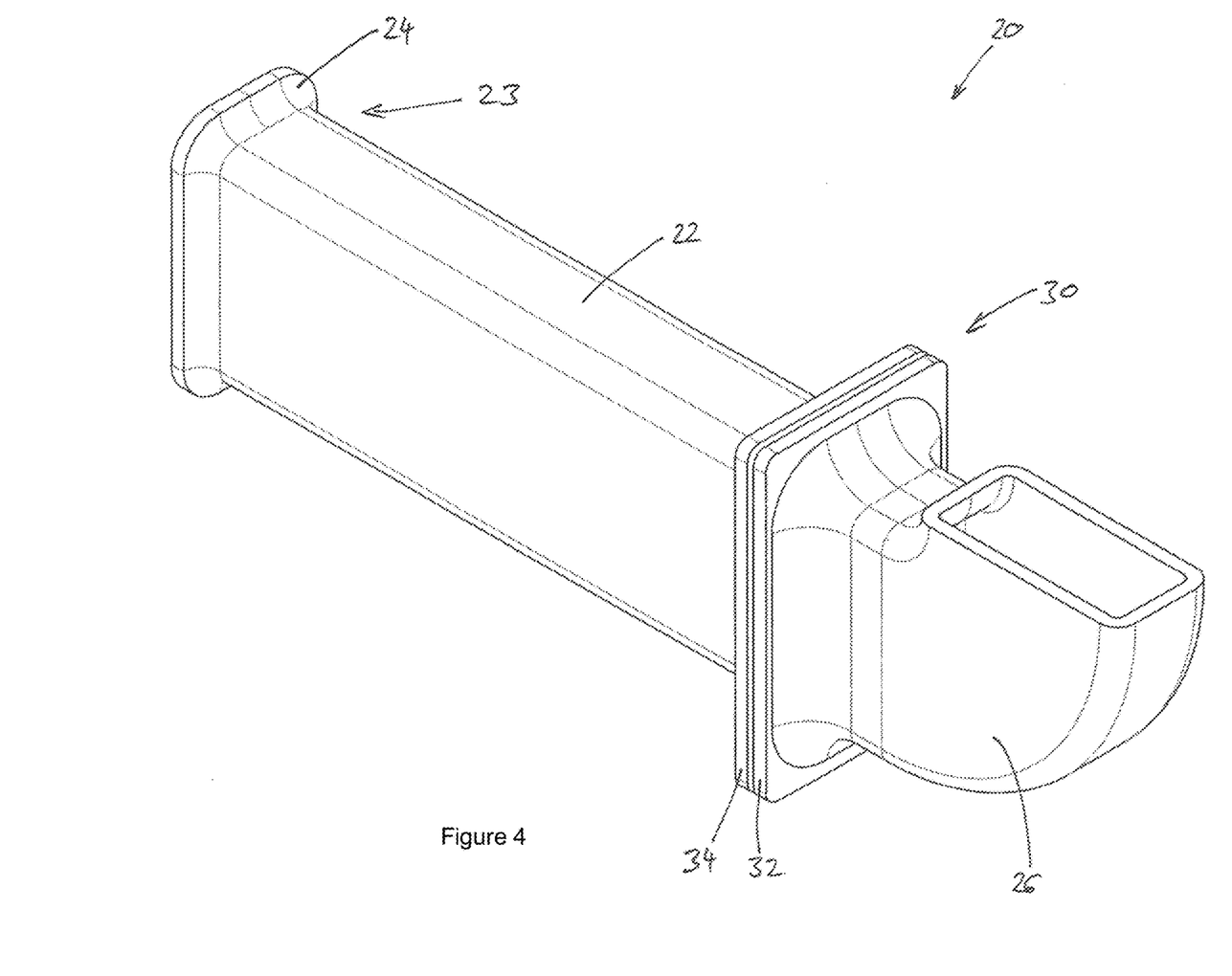
FIG. 4 shows a three-dimensional illustration of the insert part of the exemplary embodiment depicted in FIG. 1.

One single view of the insert part 20 is shown in FIG. 4. It can be seen there that the insert part 20 has a tubular guiding element 22. As can be seen in the situation depicted in FIG. 1 and FIG. 2, one end of the guiding element 22 in an installed state may engage through the receiving element 40 and project into the second element 70. This end of the guiding element 22 is thus designated as an engaging end 23. On this engaging end 23, the guiding element 22 may have a blocking element 24. In the present exemplary embodiment, this blocking element 24 is formed by expanding the tubular guiding element 22. On the end opposing the blocking element 24, the guiding element 22 may have a flange element 30. Preferably, the flange element 30 has an internal contact element 32 as well as an external contact element 34. As can be seen in FIG. 1 and FIG. 2, the wall 62 of the first element 60 is arranged between the internal contact element 32 and the external contact element 34 in a preferred embodiment.

In the present exemplary embodiment of a conduit guide, an opening piece 26 connects to the flange element 30 of the insert part 20. The opening piece 26 particularly has the function to align the conduit section corresponding to its position and thus prevent damages of the conduit section, particularly by bending or rubbing. For meeting this function, the opening piece 26 may have one or more bends. As FIG. 1, FIG. 2 and FIG. 4 show, the opening piece 26 in the present exemplary embodiment is bent upwards in the installation situation. Furthermore, it can be seen that the opening piece 26 may have the same cross-section as the guiding element 22.

The whole insert part 20 is produced integrally in the present exemplary embodiment and consists of an elastomer, particularly polyurethane.

Figure 5:
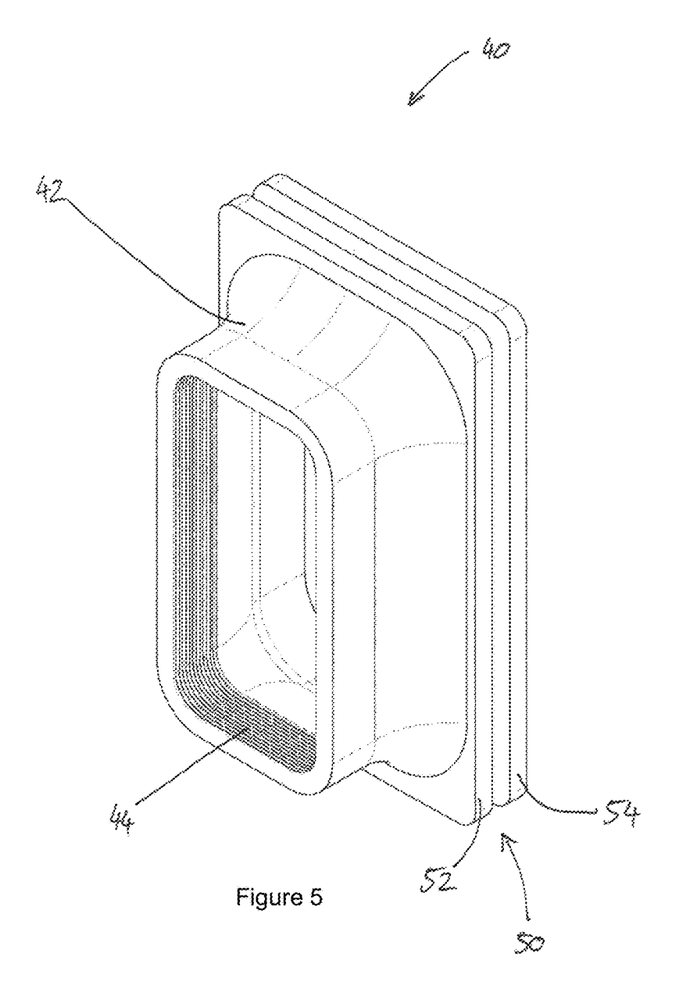
FIG. 5 shows a three-dimensional illustration of the receiving part of the exemplary embodiment depicted in FIG. 1.

The insert part 40 of the present exemplary embodiment of a conduit guide 10 is shown in a single illustration in FIG. 5. The insert part 40 may also have a flange element 50 with an internal contact element 52 as well as an external contact element 54. A receiving grommet 42 may connect to the internal contact element 52 of the flange element 50. On its inner side, the receiving grommet 42 may have at least sectionally a ribbing 44. The receiving part 40 also has a tubular cross-section which may correspond to the tubular cross-section of the guiding element 22 regarding its form. Particularly, the inner diameter of the receiving part 40 is aligned with the outer diameter of the guiding element 22. In the present exemplary embodiment, the receiving part 40 is designed integrally like the insert part 20 and consists of an elastomer, preferably polyurethane.

As can particularly be seen in FIG. 1 and FIG. 2, the flange element 50 of the receiving part 40, like the flange element 30 of the insert part 20, may be adapted to the wall thickness or the form of the recess of the wall 72 of the second element 70.

The fit between the flange element 30 of the insert part 20 and the wall 62 of the first element 60 as well as the fit between the flange element 50 of the receiving part 40 and the wall 72 of the second element 70 may be dimensioned so that there will be a sealing effect at the respective contact area of the respective flange element 30 or 50, respectively. Thus, the undesired leakage of substances, particularly the undesired entry of substances, particularly debris, may be counteracted. The resilient material characteristics of the elastomer used may promote the sealing effect.

The installation of the insert element 20 designed integrally in the first element 60 or, respectively, the receiving part 40 in the second element 70 is also enabled by the resilient material characteristics of the elastomer used in the present exemplary embodiment. Thus, for installation, the insert part 20 or, respectively, the receiving part 40 may be fold together, inserted into the respective recess of the wall 62 or, respectively, the wall 72 and then fit. In the same manner, for installation, the guiding element 22 of the insert element 20 may be fold together and the blocking element 24 may be pulled through the receiving part 40. In the completely installed state, the guiding element 22 of the insert part 20 is arranged in the receiving part 40 so as to be axially movable.

The blocking element 24 may be designed such that its biggest outer diameter is bigger than the smallest inner diameter of the receiving part 40. With positions in the area of the maximum distance between the first element 60 and the second element 70 the conduit guide 10 is dimensioned for, sliding out the guiding element 22 of the receiving part 40 may be prevented and thus the functionality of the conduit guide 10 may be ensured.

In the installation situation, the conduit section may be received in the first element 60 through the opening piece 26, pulled through the receiving part 40 while being surrounded by the guiding element 22 and finally released at the engaging end 23 into the second element 70.

As can particularly be seen in FIG. 2, a planar contact 36 circulating the perimeter of the guiding element 22 may be implemented between the guiding element 22 and the receiving grommet 42 in the installation state. This planar contact 36 may particularly meet a sealing function in order to prevent the undesired leakage of substances from the second element 70 as well as the undesired entry of substances into the second element 70, particularly dirt. Furthermore, the ribbing 44 which may be arranged at least sectionally in the area of contact 36 on the side of the receiving part 40 facing the guiding element 22 may reduce the friction between the guiding element 22 and the receiving part 40 and thus support the axial movability of the guiding element 22.

Furthermore, as can be seen in FIG. 2, the conduit guide 10 in the form shown minimizes the space requirement between the first element 60 and the second element 70 as the guiding element 22 may be almost completely inserted into the second element 70 in the event of an approaching of the first element 60 and the second element 70.

Figure 3:
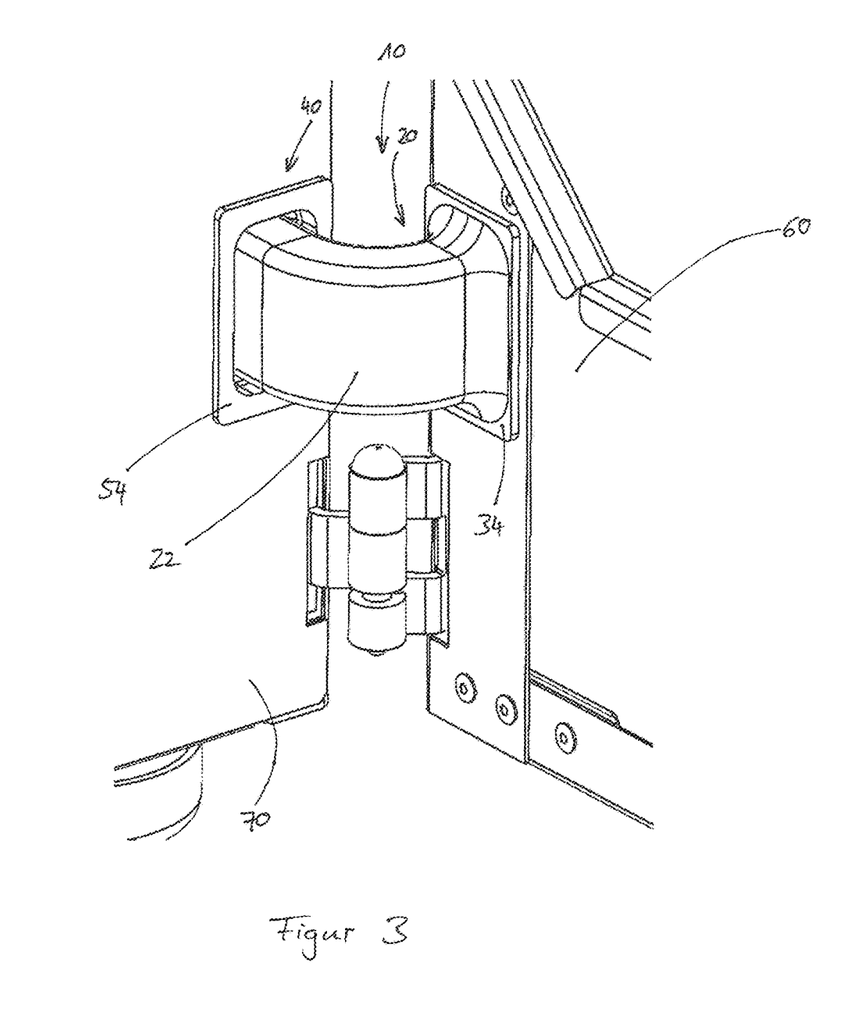
FIG. 3 shows a three-dimensional illustration of the exemplary embodiment depicted in FIG. 1 in an installation situation with bended insert part due to an angled offset.

FIG. 3 shows the exemplary embodiment of a conduit guide 10 in a further installation situation. The first element 60 and the second element 70 are arranged relative to each other with an angled offset. The second element 70 may be a device and the first element 60 may be a door of the device. Caused by the constructive design, the first element 60 and the second element 70 are movable relative to each other with an angled offset in this installation situation. A conduit guide 10 may compensate for this offset also in the event of an occurring relative movement between the first element 60 and the second element 70 in a flexible manner and preferably by a purely resilient deformation of the guiding element 22 of the insert part 20.

LIST OF REFERENCE NUMERALS

10 Conduit guide
20 Insert part
22 Guiding element
23 Engaging end
24 Blocking element
26 Opening piece
30 Flange element
32 Internal contact element
34 External contact element
36 Contact
40 Receiving part
42 Receiving grommet
44 Ribbing
50 Flange element
52 Internal contact element
54 External contact element
60 First element
62 Wall
70 Second element
72 Wall

What is claimed is:

1. A conduit guide for guiding at least one conduit section between a first element and a second element, the conduit guide comprising:
  an insert part having a tubular guiding element with a tubular guiding element flange and a flared blocking end, wherein the insert part is arrangeable at the first element;

a tubular receiving part sized to receive tubular guiding element and having a receiving flange, wherein the tubular receiving part is arrangeable at the second element;

a bent conduit orientation piece extending from the tubular guiding element;

wherein the guiding element of the insert part is arranged so as to be axially movable in the receiving part;

wherein an inner diameter of the tubular receiving part and an outer diameter of the tubular guiding element are in linear or planar contact with each other;

wherein, when the tubular guiding element is arrangeable at the first element and the tubular receiving part is arrangeable at the second element, the tubular guiding element is axially moveable in the tubular receiving part and the bent conduit orientation piece orientates a further conduit section beyond the tubular guiding element;

wherein the tubular guiding element flange comprises an internal guiding element flange contact face and an external guiding element flange face;

wherein the receiving flange comprises an internal receiving flange contact face and an external receiving flange face;

wherein, when the tubular guiding element is installed in the first element, the tubular guiding element flange couples to the first structure by the internal guiding element flange contact face and the external guiding element flange face fastening a portion of the first structure between the internal guiding element flange contact face and the external guiding element flange face;

wherein, when the tubular receiving part is installed in the second structure, the tubular receiving part couples to the second structure by the internal receiving flange contact face and the external receiving flange face fastening a portion of the second structure between the internal receiving flange contact face and the external receiving flange face; and wherein the tubular receiving part in a region of contact has a ribbing on a side facing the tubular guiding element.

2. The conduit guide according to claim 1, wherein the insert part, the receiving part, or both the insert part and the receiving part, comprise, at least sectionally, resilient material.

3. The conduit guide according to claim 1, wherein the receiving part has a receiving grommet.

4. The conduit guide according to claim 1, wherein the receiving grommet is arranged at the internal receiving flange contact face or at the external receiving flange face.

5. The conduit guide according to claim 1, wherein the receiving part in a region of contact has a ribbing on a side facing the guiding element.

6. The conduit guide according to claim 1, wherein the insert part has an end engaging through the receiving part.

7. The conduit guide according to claim 1, wherein the flared blocking end is formed by expanding the guiding element.

8. The conduit guide according to claim 1, wherein the insert part has an opening piece on at least one of its ends.

9. The conduit guide according to claim 8, wherein the opening piece has at least one bending.

10. The conduit guide according to claim 1, wherein the insert part, the receiving part, or both the insert part and the receiving part, are designed integrally.

11. A system, according to claim 1, wherein the second element is a device and the first element is a door of the device.

12. A system, comprising:

an elongated conduit guide section with a conduit guide section flange and a flared blocking end;

a receiving frame sized to receive the elongated conduit guide section and having a receiving frame flange;

a bent conduit orientation piece extending from the conduit guide section;

wherein an inner diameter of the receiving frame and an outer diameter of elongated conduit guide section are in linear or planar contact with each other;

wherein, when the elongated conduit guide section is installed in a first structure and the receiving frame is installed in a second structure, the elongated conduit guide section is axially moveable in the receiving frame and the bent conduit orientation piece orientates a further conduit section beyond the elongated conduit guide section;

the conduit guide section flange comprises an internal guide section flange contact face and an external guide section flange face;

the receiving frame flange comprises an internal receiving frame flange contact face and an external receiving frame flange face;

wherein, when the elongated conduit guide section is installed in the first structure, the conduit guide section flange couples to the first structure by the internal guide section flange contact face and the external guide section flange face fastening a portion of the first structure between the internal guide section flange contact face and the external guide section flange face;

wherein, when the receiving frame is installed in the second structure, the receiving frame flange couples to the second structure by the internal receiving frame flange contact face and the external receiving frame flange face fastening a portion of the second structure between the internal receiving frame flange contact face and the external receiving frame flange face; and wherein the receiving frame in a region of contact has a ribbing on a side facing the guiding section.

13. The systems of claim 12, wherein the elongated conduit guide section and the bent conduit orientation piece are an integrated single conduit component and the receiving frame is an integrated single frame component.

14. The systems of claim 12, wherein at least a portion of the integrated single conduit component, the integrated single frame component, or both the integrated single conduit component and the integrated single frame component, comprise a resilient, elastomeric material and are foldable for installation.

* * * * *